United States Patent [19]
Hostetler

[11] Patent Number: 5,293,836
[45] Date of Patent: Mar. 15, 1994

[54] WATER RETAINING TRIGGER PIN

[75] Inventor: Eldon Hostetler, Middlebury, Ind.

[73] Assignee: Ziggity Systems, Inc., Middlebury, Ind.

[21] Appl. No.: 4,966

[22] Filed: Jan. 15, 1993

[51] Int. Cl.⁵ ............................................. A01K 39/02
[52] U.S. Cl. ........................................ 119/72; 119/81
[58] Field of Search ................. 119/72.5, 72, 74, 75, 119/51.01, 51.04, 52.1, 54, 81

[56] References Cited
U.S. PATENT DOCUMENTS

| 923,611 | 6/1909 | Werd . | |
| 2,295,964 | 9/1942 | Null | 119/81 |
| 2,336,120 | 12/1943 | Null | 119/81 |
| 2,614,531 | 10/1952 | Futterer . | |
| 2,752,935 | 7/1956 | Keyser | 119/81 |
| 3,092,078 | 6/1963 | Goswick | 119/81 |
| 3,804,068 | 4/1974 | Steudler, Jr. | 119/81 |
| 4,516,533 | 5/1985 | Mallinson | 119/72 |
| 4,589,373 | 5/1986 | Hostetler et al. | 119/72.5 |
| 4,660,509 | 4/1987 | Steudler, Jr. . | |

FOREIGN PATENT DOCUMENTS

| 485141 | 7/1952 | Canada | 119/72 |
| 1419642 | 8/1988 | U.S.S.R. | 119/72 |

Primary Examiner—Gene Mancene
Assistant Examiner—Thomas Price
Attorney, Agent, or Firm—Barnes & Thornburg

[57] ABSTRACT

A trigger-type drinker for poultry and small animals including a water retaining disc at the free end of the trigger pin is disclosed. The disc is generally flat with an upturned lip around the perimeter thereof. A residual water drop or water leaking from the drinker runs down the trigger pin and collects on the disc, contained by the lip. The disc allows several drops of water to collect at the bottom of the pin. The increased amount of water on the pin assists in attracting birds to the drinker. When the bird actuates the drinker, the disc tilts toward the bird, thereby causing the water to run across the surface of the disc and into the bird's mouth. Thus, the disc assists in directing more water to the bird. Additionally, because the side of the disc farthest from the bird tilts upward as the bird actuates the drinker, it not only acts as a ramp for the water to flow downward toward the bird, but also acts as a retaining wall, preventing the water from flying off the opposite side of the pin Accordingly, the floor of the poultry house remains drier.

21 Claims, 4 Drawing Sheets

WATER RETAINING TRIGGER PIN

BACKGROUND AND SUMMARY OF THE INVENTION

This application relates to nipple or trigger-type poultry watering devices, and, more specifically, to an improved method for retaining water on the trigger pin of such a drinker.

Trigger-type watering devices are commonly used for delivering water to poultry in poultry houses. Such drinkers generally include a cylindrical chamber through which the water flows. One end of the chamber is adapted to be fit to a water supply line and includes an inlet for allowing water to pass from the supply line into the chamber. The other end of the chamber generally includes an opening to allow fluid to flow out of the chamber. A valve seat and valve member are normally disposed within the chamber to prevent water from flowing out when the drinker is not being actuated by a bird. A valve actuating member is normally housed partially within the chamber and extends through the chamber outlet. The valve actuating member normally includes a cylindrical pin portion, which the bird pecks or lifts, thereby unseating the valve member from the valve seat and allowing water to flow through the chamber and out to the bird. When actuation ceases, the valve member returns to the valve seat, thereby shutting off the water flow.

In many instances, a drop of water will remain hanging from the end of the pin after the bird has finished drinking. Similarly, a drop of water may also collect on the pin if the drinker leaks. The residual drop of water on the pin serves a useful function in that it attracts birds to the drinkers. When a thirsty bird sees the residual drop of water on the pin, it knows that it should go to the drinker to get water. However, it my also happen that the residual drop of water is so large that it eventually falls from the pin onto the floor of the poultry house. Additionally, if the watering system is vibrated, such as when a bird bumps into it, the droplet may fall from the pin. Furthermore, if a large or strong bird pecks at the pin forcefully, the water drop may fly off the pin on the side opposite the bird. Accordingly, the bird does not receive any water and the floor of the poultry house does. Aside from the fact that the poultry do not receive as much water under these circumstances, the health of the poultry is also threatened by the increased wetting of the manure on the floor of the poultry house. The wetter the manure is, the easier it is for bacteria and disease to breed in the poultry house.

Accordingly, it is an object of the present invention to provide an improved trigger-type drinker for poultry and small animals.

Another object of the present invention is to provide a trigger-type drinker that reduces the amount of water on the floor of the poultry house.

Yet another object of the present invention is to provide a trigger-type drinker that better attracts poultry to the water source.

Still another object of the present invention is to provide a trigger-type drinker that better directs the water flow toward the bird activating the drinker.

These and other objects of the present invention are attained by the provision of a water retaining disc at the free end of the trigger pin. The disc is generally flat with an upturned lip around the perimeter thereof. The residual water drop or water leaking from the drinker runs down the trigger pin and collects on the disc, contained by the lip. The disc allows several drops of water to collect at the bottom of the pin. The increased amount of water on the pin assists in attracting birds to the drinker. When the bird actuates the drinker, the disc tilts toward the bird, thereby causing the water to run across the surface of the disc and into the bird's mouth. Thus, the disc assists in directing more water to the bird. Additionally, because the side of the disc farthest from the bird tilts upward as the bird actuates the drinker, it not only acts as a ramp for the water to flow downward toward the bird, but also acts as a retaining wall, preventing the water from flying off the opposite side of the pin Accordingly, the floor of the poultry house remains drier.

Other objects, advantages and novel features of the present invention will now be readily apparent to those skilled in the art upon consideration of the following detailed drawings and description.

DETAILED DESCRIPTION OF THE PREFERRED EMBODIMENTS

Figure 1:
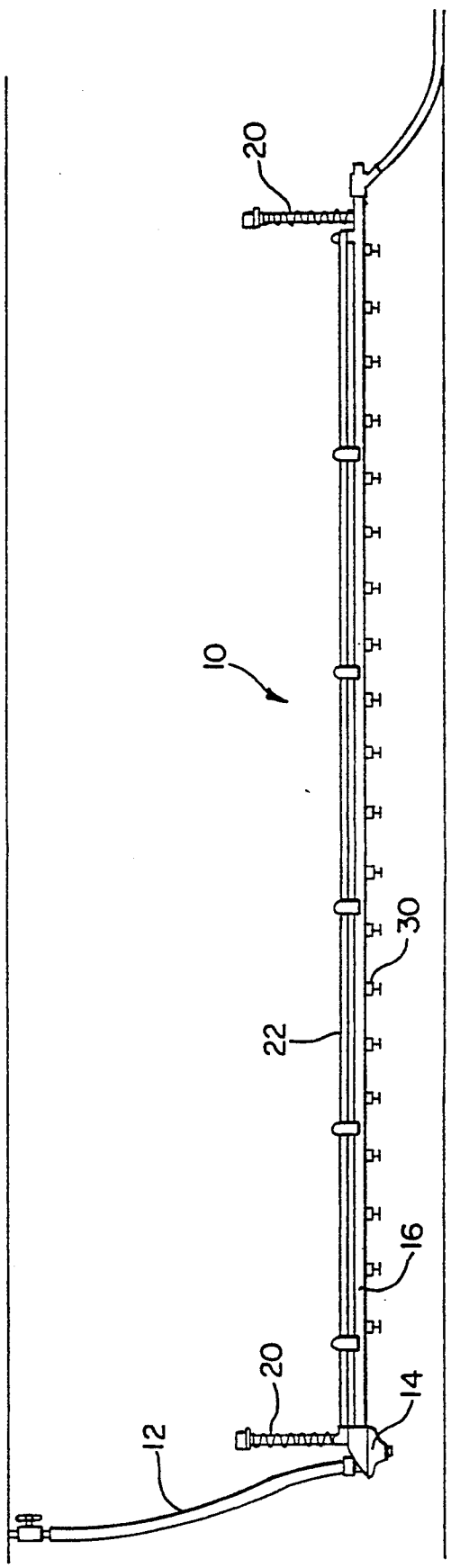
FIG. 1 shows a side plan view of a typical poultry watering system.

FIG. 1 shows a side-plan view of a typical poultry watering system generally indicated by the number 10. Hose 12 is connected to a water supply (not shown) and leads into pressure regulator 14, which is attached to one end of supply line 16. A first stand pipe 20 is attached to pressure regulator 14, and a second stand pipe 20 is attached to supply line 16 at the opposite end of system 10. Stand pipes 20 provide a visual indication of the water pressure. Reinforcing pipe 22 is attached to supply line 16 and runs the length thereof. System 10 is supported by wires or ropes (not shown) attached to the ceiling of the poultry house and to reinforcing pipe 22. Drinkers 30 extend downward from supply line 16.

Figure 2:
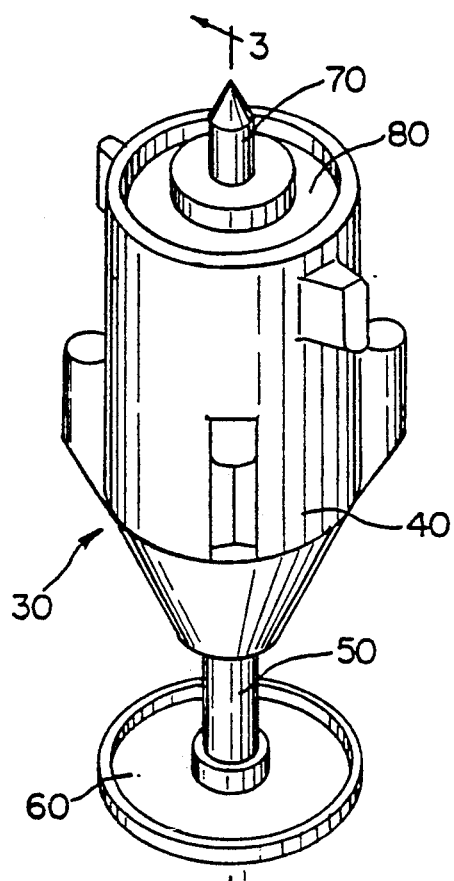
FIG. 2 shows a perspective view of a drinker equipped with a water retaining disc according to the present invention.
Figure 3:
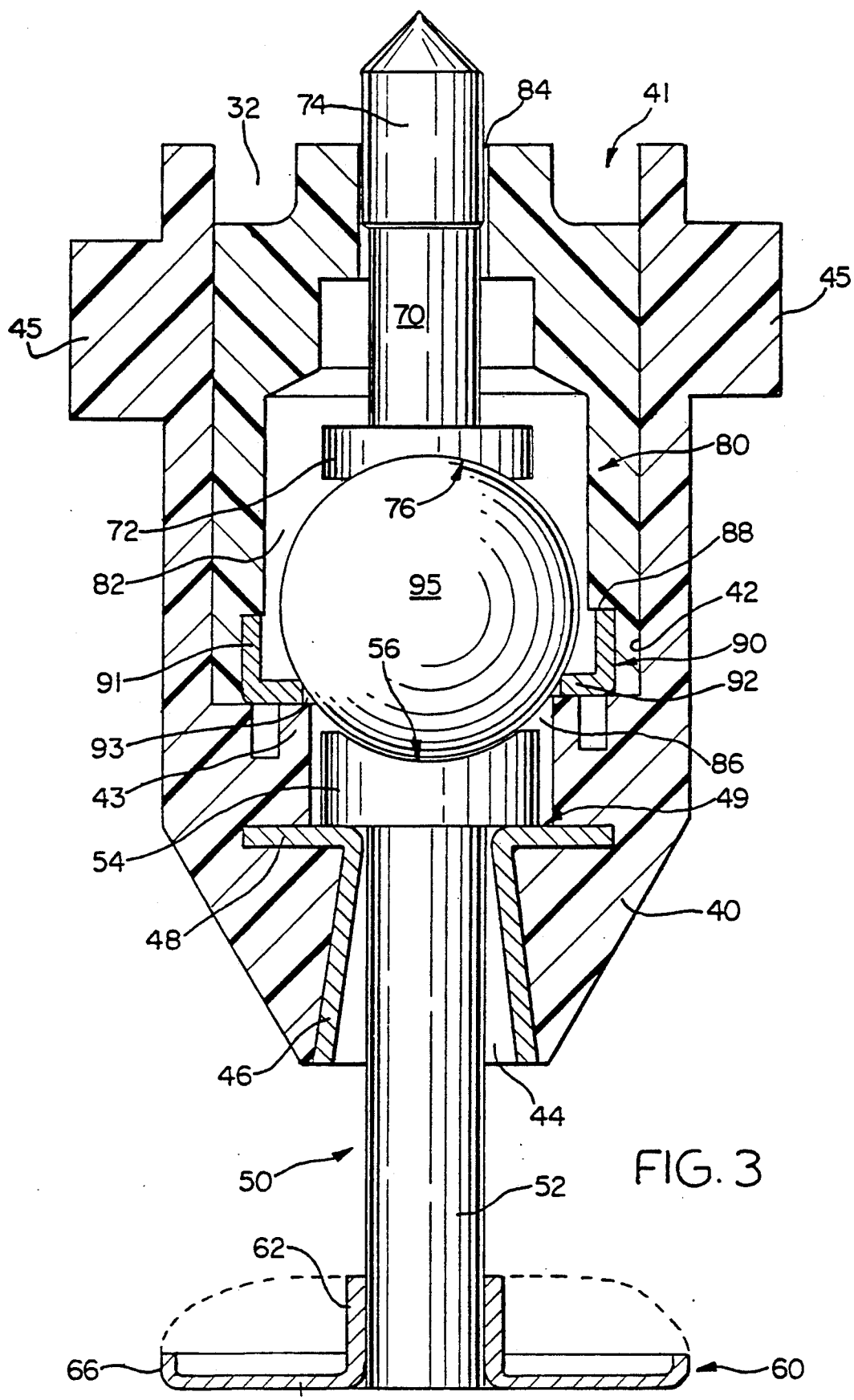
FIG. 3 shows a cross-sectional view taken along line 3—3 in FIG. 2.
Figure 5:
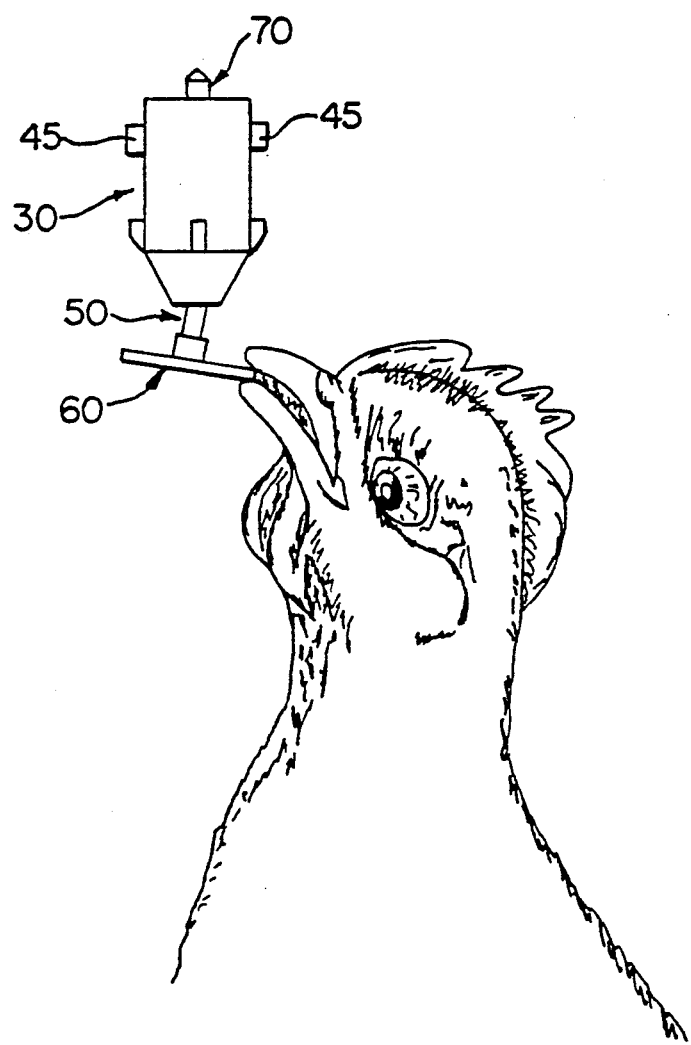
FIG. 5 shows a bird actuating the drinker shown in FIG. 2.

FIG. 2 shows a perspective view of a trigger-type drinker 30 according to the present invention. Drinker 30 typically includes body unit 40, valve actuating member (or "trigger") 50, water retaining disc 60, metering pin 70 and valve chamber 80. As can be more readily seen in FIG. 3, housing unit 40 has a generally cylindrical chamber 41 with an interior surface 42. Arms 45 extend outward from housing 40 and are used to attach drinker 30 to system 10 as described below. It has been found advantageous to make housing 40 out of ABS plastic. Housing 40 has a frusto-conical bore 44 located at one end, which provides the outlet for water as will be described below. Bore 44 is lined with wear resistant insert 46. Insert 46 is generally frusto-conical with a flange 48, the top surface of which forms seat 49. Housing 40 is further integrally provided with an annular stop 43. Trigger 50 includes a generally cylindrical pin 52 with an actuator head 54 disposed at one end thereof. Actuator head 54 has a depression 56 in the top surface thereof. Disc 60 includes sleeve 62 and collecting surface 64. Lip 66 extends upwardly from collecting surface 64. Disc 60 is preferably made from a nonhydroscopic material, such as a nonhydroscopic plastic or stainless steel. FIG. 3 also shows valve seat 90 and valve member 95. Valve seat 90 is an annular metal ring with sidewall 91 and seating surface 92. Opening 93 in valve seat 90 allows water to flow downward along trigger 50 as discussed below. Valve member 95 is a sphere. Trigger 50 is preferably made from 304 stainless steel. Valve seat 90 and valve member 95 are preferably made from 302 stainless steel.

Valve chamber 80, metering pin 70, valve member 95, and valve seat 90 form the valve assembly for drinker 30. Valve chamber 80 has a cavity 82 therein with an inlet 84 at one end and an opening 86 at the other. Lip 88 is an integrally formed part of valve chamber 80. It has been found advantageous to make valve chamber 80 from ABS plastic. To form the valve assembly, metering pin 70 is inserted in valve chamber 80 through opening 86 such that body portion 74 extends through inlet 84. Valve member 95 is then inserted in valve chamber 80 through opening 86. Finally, valve seat 90 is inserted in opening 86 of valve chamber 80 until sidewall 91 rests fully on lip 88. The clearance between sidewall 91 of valve seat 90 and opening 86 of valve chamber 80 are such that valve seat 90 is tightly press-fit in opening 86. Furthermore, seating surface 92 of valve seat 90 has a coined edge (not shown) corresponding to the curvature of valve member 95. As assembled, valve chamber 80, valve seat 90, valve member 95 and metering pin 70 form a self-contained valve assembly.

To assemble drinker 30, trigger 50 is inserted in housing 40 such that pin 52 extends through bore 4 and actuator head 54 rests on seat 49. The entire valve assembly is then inserted in cylindrical chamber 41 of housing 40 until advancement is prohibited by stop 43. In this position, stop 43 and lip 88 ensure proper alignment of valve seat 90. Valve member 95 rests on the edges of seating surface 92 of valve seat 90 and extends partially through opening 93. The portion of valve member 95 extending below valve seat 90 rests spaced apart from actuator head 54 of trigger 50. Water retaining member 60 is then attached to trigger 50 by inserting pin 52 into sleeve 62. The dimensions of pin 52 and sleeve 62 are such that water retaining member 60 is held in place by a tight press-fit.

Figure 4:
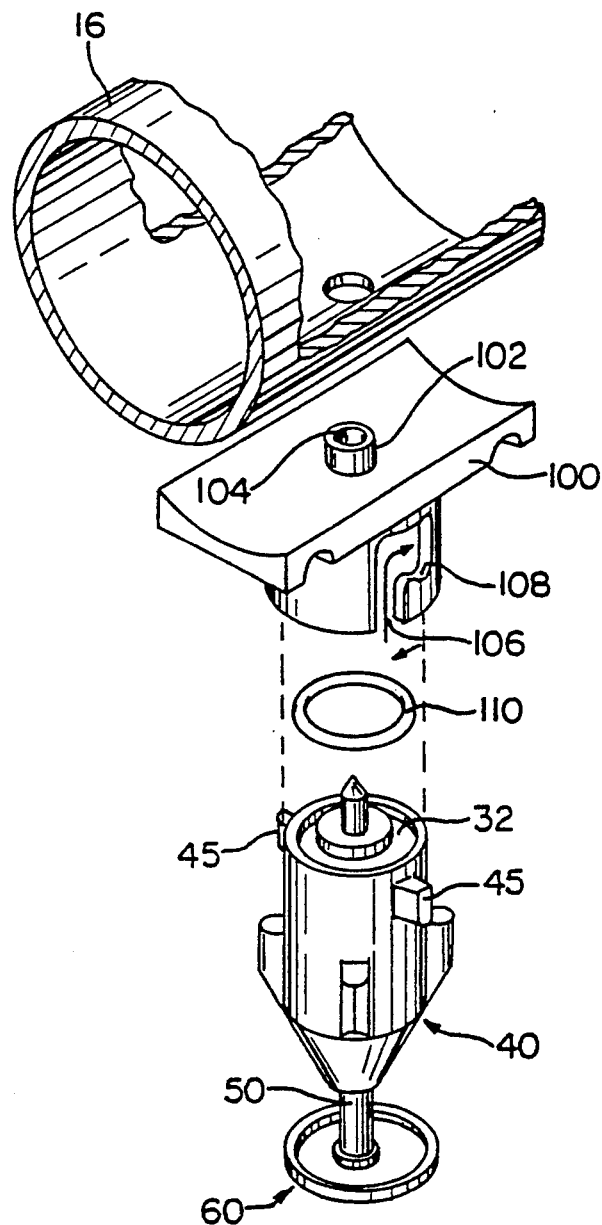
FIG. 4 shows a mounting method for the drinker shown in FIG. 2.

Drinker 30 can be attached to supply line 16 as shown in FIG. 4. The attachment mechanism shown in FIG. 4 is currently sold by Ziggity Systems, Inc. as the "Twin-Hook Saddle." Element 100 is ultrasonically welded to supply line 16 such that tube 102 with opening 104 therein extends into supply line 1. O-ring 110 is then inserted in groove 32, and drinker 30 is raised such that arms 45 on housing 40 engage slot 106 in element 100. Drinker 30 is then rotated so that arms 45 are offset from slot 102 and rest on surface 108 of element 100. So mounted, water flows through opening 104 in element 100, through opening 84 in valve chamber 80, and into cavity 82 (FIG. 3). The seal formed by valve member 95 resting on valve seat 90 prevents the water from flowing out of cavity 82 in valve chamber 80. Further sealing is provided by actuator head 54 resting against seat 49.

To obtain water from drinker 30, a fowl or other small animal would peck or grasp disc 60 on trigger 50. This motion of trigger 50 would cause actuator head 54 to be unseated from seat 49 (FIG. 3). Furthermore, as actuator head 54 becomes unseated, it will lift valve member 95, thereby unseating it from valve seat 90. When this occurs, water is free to flow through inlet 84, into cavity 82, through opening 86, out bore 44, and onto disc 60. As can be seen in FIG. 4, when the bird pecks or grasps disc 60, it will tilt in the direction of the bird. As this occurs, the water on disc 60 runs across the surface thereof and into the bird's mouth. Additionally, collecting surface 64 and lip 66 of disc 60 on the side opposite the bird swing upward when the bird actuates the drinker and act as a retaining wall, thus hindering water from flying off the back side of disc 60. Accordingly, the bird receives more water and the floor of the poultry house is kept drier.

When the fowl or other animal ceases actuation of pin 52, actuator head 54 will again seat on seat 49, and valve member 95 will seat on valve seat 90, thereby shutting off the flow of water. Any residual water on trigger 50 (or any leaking water) will collect on disc 60, as shown by the dotted line in FIG. 3.

Figure 6:
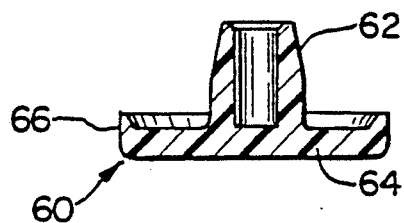
FIG. 6 shows another embodiment of a water retaining disc according to the present invention.

From the foregoing description, it will now be obvious to those skilled in the art that various embodiments of the present invention are possible. For example, disc 60 can be adapted to fit any style trigger drinker, regardless of the internal valve element or method of attaching the system to the water supply line. Additionally, disc 60 could be attached to the trigger pin by means other than a press-fit. Also, lip 66 on disc 60 can be vertical or angled, and sleeve 62 can be tapered. This embodiment is shown in FIG. 6.

Although the present invention has been described in detail, the same is by way of illustration and example only and is not to be taken by way of limitation. The spirit and scope of the invention are to be limited only by the claims appended hereto.

What is claimed is:

1. A valve actuating member for a trigger-type drinker, said member comprising:
   a head portion;
   a pin portion extending from said head portion; and
   first means attached to said pin portion for retaining fluid and providing said fluid to a bird in response to actuation force applied to said valve actuating member from a side thereof and for hindering the dispersal of said fluid from a side other than the side of actuation.

2. The valve actuating member according to claim 1 in combination with a drinker housing having an inlet, an outlet, a valve chamber disposed between said inlet and outlet, and a valve seat and a valve member disposed in said valve chamber, said valve actuating member disposed such that said head portion is adjacent said valve member and said pin portion extends through said outlet.

3. The valve actuating member according to claim 2 wherein said first means includes a substantially flat disc having a lip disposed thereon and a sleeve extending upwardly from said disc and engaging said pin portion.

4. The valve actuating member according to claim 2 wherein said first means moves with said valve actuating member.

5. A device for supplying water to poultry and small animals, said device comprising:
   a chamber including an inlet and an outlet;
   a valve seat and a valve member disposed in said chamber;

a valve actuating member housed partially within said chamber and extending through said outlet; and first means disposed on said valve actuating member for retaining fluid and providing said fluid to a bird in response to actuation force applied to said means from a side thereof and for hindering the dispersal of said fluid from a point other than the point of actuation by said bird.

6. The device according to claim 3 wherein said first means includes a substantially flat disc having a lip disposed thereon and a sleeve extending upwardly from said disc and engaging said pin portion.

7. The device according to claim 3 wherein said first means moves with said valve actuating member.

8. A system for delivering water to poultry and small animals, said system comprising:

a hose member connected to a water supply;

a fluid conduit connected to said hose member at one end and connected to a drain valve at the other end;

at least one drinker connected to said fluid conduit, said drinker comprising a chamber, an inlet, an outlet, a valve seat and a valve member disposed in said chamber, a valve actuating member housed partially within said chamber and extending through said outlet, first means for collecting said fluid and delivering said fluid to a bird in response to actuation force applied by said bird from a side of said first means, second means disposed on said first means for receiving said actuation force and resisting dispersal of said fluid in the direction of said actuation force, and third means extending from said first means for securing said first means to said valve actuating member.

9. The system according to claim 5 wherein said first means includes a substantially flat disc.

10. The system according to claim 9 wherein said second means includes a lip disposed around the perimeter of said disc and extending upwardly therefrom.

11. The system according to claim 10 wherein said third means includes a substantially cylindrical sleeve extending upwardly from said disc and engaging said valve actuating member by means of a press-fit.

12. The system according to claim 5 wherein said first, second and third means move with said valve actuating member.

13. A device for retaining fluid on a valve actuating member of a trigger-type drinker, said device comprising:

first means for collecting said fluid and delivering said fluid to a bird in response to an actuation force applied by said bird from a side of said first means;

second means disposed on said first means for receiving said actuation force and resisting dispersal of said fluid in the direction of said actuation force; and third means extending from said first means for securing said first means to said valve actuating member.

14. The device according to claim 8 wherein said first means includes a substantially flat disc.

15. The device according to claim 9 wherein said second means includes a lip disposed around the perimeter of said disc and extending upwardly therefrom.

16. The device according to claim 10 wherein said third means includes a substantially cylindrical sleeve extending upwardly from said disc and engaging said valve actuating member by means of a press-fit.

17. The device according to claim 8 wherein said device moves with said valve actuating member.

18. In a poultry watering system having a fluid supply line, nipple drinkers disposed in spaced apart relation along said fluid supply line, said nipple drinkers including a fluid outlet, a valve member, and a valve actuating member, said valve actuating member having a first portion retained within said nipple drinker and a second portion extending through said outlet and exterior of said nipple drinker, the improvement comprising:

a ledge member attached to said second portion of said valve actuating member at a location furthest from said fluid outlet, said ledge member including a central connection means for securing said ledge member to said trigger pin, fluid retention means for supporting a limited amount of poultry watering fluid on said ledge and dispensing that fluid when said valve is actuated, and means for restricting dispersion of fluid retained on said ledge member except to poultry.

19. The invention according to claim 18 wherein said ledge member extends radially outward from said valve actuating member and said means for restricting dispersion includes a peripheral ridge formed along the radially outermost portion of said ledge member and extending towards said outlet.

20. The invention according to claim 19 wherein said central connection means includes a recess having the same cross sectional configuration as the cross sectional configuration of said valve actuating member except being a of a slightly smaller dimension prior to attachment of said ledge member to said valve actuating member.

21. The invention according to claim 18 wherein said ledge member move with said valve actuating member.

* * * * *

UNITED STATES PATENT AND TRADEMARK OFFICE
CERTIFICATE OF CORRECTION

PATENT NO. : 5,293,836

DATED : March 15, 1994

INVENTOR(S) : Eldon Hostetler

It is certified that error appears in the above-identified patent and that said Letters Patent is hereby corrected as shown below:

In the Claims, claim 3, column 4, line 57, please delete "claim 2" and insert -- claim 1 --.

In the Claims, claim 4, column 4, line 61, please delete "claim 2" and insert -- claim 1 --.

In the Claims, claim 6, column 5, line 10, please delete "claim 3" and insert -- claim 5 --.

In the Claims, claim 7, column 5, line 15, please delete "claim 3" and insert -- claim 5 --.

In the Claims, claim 9, column 5, line 38, please delete "claim 5" and insert -- claim 8 --.

In the Claims, claim 12, column 5, line 48, please delete "claim 5" and insert -- claim 8 --.

In the Claims, claim 14, column 6, line 10, please delete "claim 8" and insert -- claim 13 --.

In the Claims, claim 15, column 5, line 12, please delete "claim 9" and insert -- claim 14 --.

In the Claims, claim 16, column 6, line 15, please delete "claim 10" and insert -- claim 15 --.

In the Claims, claim 17, column 6, line 19, please delete "claim 8" and insert -- claim 13 --.

UNITED STATES PATENT AND TRADEMARK OFFICE
CERTIFICATE OF CORRECTION

PATENT NO. : 5,293,836

DATED : March 15, 1994

INVENTOR(S) : Eldon Hostetler

It is certified that error appears in the above-identified patent and that said Letters Patent is hereby corrected as shown below:

In the Claims, claim 6, column 5, line 14, please delete "pin portion" and insert -- valve actuating member --.

In the Claims, claim 18, column 6, line 33, please delete "trigger pin" and insert -- valve actuating member --.

Signed and Sealed this

Ninth Day of July, 1996

Attest:

BRUCE LEHMAN

Attesting Officer

Commissioner of Patents and Trademarks